US010520032B2

(12) United States Patent
Sakazaki et al.

(10) Patent No.: US 10,520,032 B2
(45) Date of Patent: Dec. 31, 2019

(54) ROLLING BEARING DEVICE, OIL SUPPLY UNIT, METHOD OF SUPPLYING LUBRICATING OIL, AND PROGRAM

(71) Applicant: JTEKT CORPORATION, Osaka-shi, Osaka (JP)

(72) Inventors: Tsukasa Sakazaki, Kizugawa (JP); Yoshimichi Higashiyama, Kashihara (JP); Masami Naka, Yamatokoriyama (JP)

(73) Assignee: JTEKT CORPORATION, Osaka (JP)

( * ) Notice: Subject to any disclaimer, the term of this patent is extended or adjusted under 35 U.S.C. 154(b) by 81 days.

(21) Appl. No.: 15/816,829

(22) Filed: Nov. 17, 2017

(65) Prior Publication Data

US 2018/0149201 A1    May 31, 2018

(30) Foreign Application Priority Data

Nov. 29, 2016  (JP) .................. 2016-230919

(51) Int. Cl.
*F16C 33/66*  (2006.01)
*F16C 19/06*  (2006.01)

(52) U.S. Cl.
CPC .......... *F16C 33/6659* (2013.01); *F16C 19/06* (2013.01); *F16C 2240/06* (2013.01)

(58) Field of Classification Search
CPC .............. F16C 33/6674; F16C 33/6681; F16C 33/6659; F16C 33/664; F16C 33/667; F16C 19/06; F16C 19/16; F16C 2202/36; F16C 2240/06; F16C 41/00; F16C 2233/00
See application file for complete search history.

(56) References Cited

U.S. PATENT DOCUMENTS

| 4,811,044 | A  | * | 3/1989  | Tanaka .................. G03B 7/083 396/206 |
| 6,505,968 | B1 | * | 1/2003  | Fleury .................... F16C 25/02 384/1 |
| 7,493,799 | B1 | * | 2/2009  | Discenzo ............... F16C 19/52 184/108 |
| 8,308,254 | B2 | * | 11/2012 | Tabata ................. B41J 2/04541 347/10 |
| 9,488,226 | B2 | * | 11/2016 | Watanabe ........... F16C 33/6655 |
| 10,252,532 | B2 | * | 4/2019 | Mitsuo ................ B41J 2/16526 |
| 2008/0072879 | A1 | * | 3/2008 | Nagase .............. F02D 41/2096 123/494 |
| 2009/0148087 | A1 | * | 6/2009 | Suzuki ............... F16C 33/3806 384/462 |

(Continued)

FOREIGN PATENT DOCUMENTS

JP        2016-023759 A    2/2016

*Primary Examiner* — Alan B Waits
(74) *Attorney, Agent, or Firm* — Oliff PLC

(57) ABSTRACT

A rolling bearing device includes: a bearing portion that has an inner ring, an outer ring, a plurality of balls, and a cage that holds the plurality of balls; and an oil supply unit that supplies lubricating oil to the bearing portion. The oil supply unit has: a pump that discharges the lubricating oil through drive of a piezo element; a voltage boost portion that boosts a voltage to be applied to the piezo element; and a control portion that causes the pump to operate while varying a voltage boost time included in a period since the start of voltage boost by the voltage boost portion until the start of the drive of the piezo element.

8 Claims, 7 Drawing Sheets

(56) References Cited

U.S. PATENT DOCUMENTS

| | | | |
|---|---|---|---|
| 2009/0152050 A1* | 6/2009 | Hattori | F16C 33/6674 |
| | | | 184/6.4 |
| 2016/0025138 A1* | 1/2016 | Watanabe | F16C 33/6655 |
| | | | 384/448 |
| 2016/0025141 A1* | 1/2016 | Tanimoto | F16C 33/6651 |
| | | | 384/473 |
| 2016/0333937 A1* | 11/2016 | Mizutani | F16C 33/6659 |
| 2017/0219011 A1* | 8/2017 | Sakazaki | F16C 33/6674 |
| 2017/0288120 A1* | 10/2017 | Higashiyama | F16C 33/6659 |
| 2018/0017052 A1* | 1/2018 | Naka | F04B 43/046 |
| 2018/0149201 A1* | 5/2018 | Sakazaki | F16C 19/06 |
| 2018/0283454 A1* | 10/2018 | Sakazaki | F16C 33/6659 |

* cited by examiner

ROLLING BEARING DEVICE, OIL SUPPLY UNIT, METHOD OF SUPPLYING LUBRICATING OIL, AND PROGRAM

INCORPORATION BY REFERENCE

The disclosure of Japanese Patent Application No. 2016-230919 filed on Nov. 29, 2016 including the specification, drawings and abstract, is incorporated herein by reference in its entirety.

BACKGROUND OF THE INVENTION

1. Field of the Invention

The present invention relates to a technique of supplying lubricating oil using an oil supply unit that has a pump that operates through drive of a piezo element.

2. Description of the Related Art

In recent years, various types of machine tools are requested to increase the speed of a main spindle in order to improve the processing efficiency and the production efficiency. When the main spindle is rotated at a high speed, the lubricating property of a bearing portion that supports the main spindle is particularly important. Thus, there is proposed a rolling bearing device in which an oil supply unit is provided adjacent to a bearing portion in the axial direction (see Japanese Patent Application Publication No. 2016-23759 (JP 2016-23759 A)). The oil supply unit has a tank that stores lubricating oil, a pump that discharges the lubricating oil in the tank to the bearing portion, etc.

The oil supply unit described above is installed, together with the bearing portion, in a narrow annular space between the main spindle and a housing on the outer side thereof, for example. Therefore, with the oil supply unit, it is preferable to reduce the frequency of replenishing the tank with lubricating oil as much as possible in order to improve maintainability and manageability. To this end, it is necessary to suppress wasteful discharge (consumption) of lubricating oil by the pump, and the pump shall preferably discharge only a minute amount of lubricating oil.

In order to discharge only a minute amount of lubricating oil, there is proposed a pump (piezo pump) that discharges lubricating oil through drive of a piezo element. In the case of this pump, however, the velocity and the amount of lubricating oil (oil droplets) to be discharged are varied in accordance with the viscosity of the lubricating oil. The viscosity of lubricating oil is significantly affected by the temperature thereof. That is, in the case where the viscosity of lubricating oil is high (the temperature is low), the discharge velocity is low, or lubricating oil may not be discharged. In the case where the viscosity of lubricating oil is low (the temperature is high), in contrast, the discharge velocity is high, and the amount of discharge tends to be large, which may lead to wasteful consumption. In the case of a piezo pump, in this way, the manner of discharge of lubricating oil may be fluctuated in accordance with the viscosity (temperature).

SUMMARY OF THE INVENTION

It is an object of the present invention to suppress the fluctuation of the manner of discharge of lubricating oil from a pump in accordance with the viscosity (temperature) of the lubricating oil.

An aspect of the present invention provides a rolling bearing device including: a bearing portion that has an inner ring, an outer ring, a plurality of rolling elements interposed between the inner ring and the outer ring, and a cage that holds the plurality of rolling elements; and an oil supply unit provided adjacent to the bearing portion in an axial direction to supply lubricating oil to the bearing portion, in which the oil supply unit includes: a pump that discharges the lubricating oil through drive of a piezo element; a voltage boost portion that boosts a voltage to be applied to the piezo element; and a control portion that causes the pump to operate while varying a voltage boost time included in a period since start of voltage boost by the voltage boost portion until start of the drive of the piezo element.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
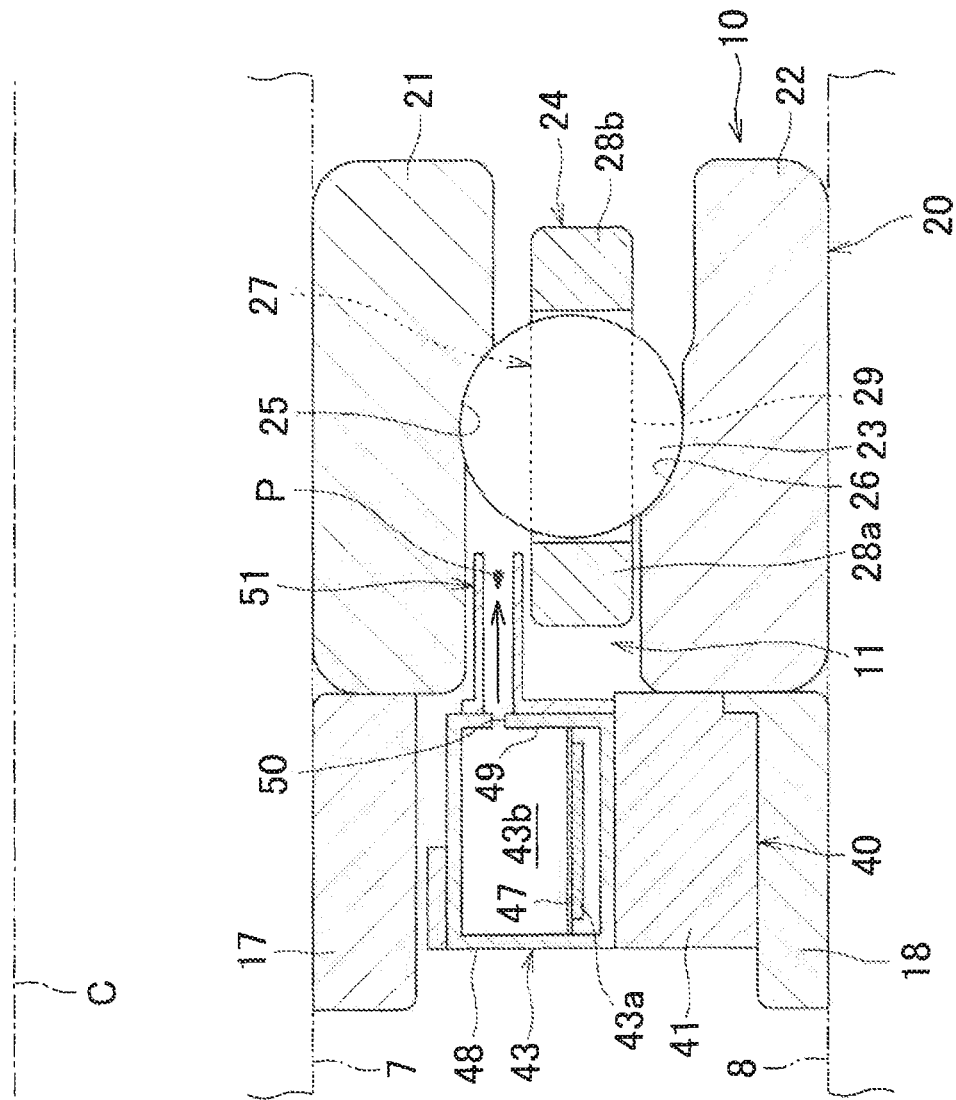
FIG. 1 is a sectional view illustrating a rolling bearing device according to an embodiment.

FIG. 1 is a sectional view illustrating a rolling bearing device according to an embodiment. A rolling bearing device 10 (hereinafter referred to also as a "bearing device 10") illustrated in FIG. 1 rotatably supports a main spindle (shaft 7) of a main spindle device of a machine tool, and is housed in a bearing housing 8 of the main spindle device. In FIG. 1, the shaft 7 and the bearing housing 8 are indicated by the long dashed double-short dashed lines. The bearing device 10 is also applicable to devices other than machine tools. In the following description, the direction which is parallel to a center line C of the bearing device 10 is referred to as an "axial direction", and the direction which is orthogonal to the axial direction is referred to as a "radial direction".

The bearing device 10 includes a bearing portion 20 and an oil supply unit 40. The bearing portion 20 has an inner ring 21, an outer ring 22, a plurality of balls (rolling elements) 23, and a cage 24 that holds the plurality of balls 23, and constitutes a ball bearing (rolling bearing). The bearing device 10 further includes an inner ring spacer 17 and an outer ring spacer 18 in a cylindrical shape.

The oil supply unit 40 has a circular ring shape as a whole, is attached to the radially inner side of the outer ring spacer 18, and is positioned adjacent to the bearing portion 20 in the axial direction. The oil supply unit 40 has a function of supplying lubricating oil to the bearing portion 20. The configuration and the function of the oil supply unit 40 will be described in detail later. In the embodiment, the oil supply unit 40 (body portion 41) and the outer ring spacer 18 are separate from each other. However, the oil supply unit 40 and the outer ring spacer 18 may be integral with each other.

In this case, the oil supply unit 40 also has a function as an outer ring spacer, in addition to the function of supplying oil.

In the embodiment, the outer ring 22, the outer ring spacer 18, and the oil supply unit 40 are attached so as not to be rotatable with respect to the bearing housing 8, and the inner ring 21 and the inner ring spacer 17 are rotatable together with the shaft 7. Thus, the outer ring 22 serves as a stationary ring that is not rotatable, and the inner ring 21 serves as a rotary ring that is rotatable together with the shaft 7.

The inner ring 21 is a cylindrical member that is externally fitted with the shaft 7. A raceway (hereinafter referred to as an "inner ring raceway 25") is formed on the outer periphery of the inner ring 21. In the embodiment, the inner ring 21 and the inner ring spacer 17 are separate from each other. However, the inner ring 21 and the inner ring spacer 17 may be (inseparably) integral with each other, although not illustrated. The outer ring 22 is a cylindrical member fixed to the inner peripheral surface of the bearing housing 8. A raceway (hereinafter referred to as an "outer ring raceway 26") is formed on the inner periphery of the outer ring 22. In the embodiment, the outer ring 22 and the outer ring spacer 18 are separate from each other. However, the outer ring 22 and the outer ring spacer 18 may be (inseparably) integral with each other, although not illustrated.

The balls 23 are interposed between the inner ring 21 and the outer ring 22, and roll on the inner ring raceway 25 and the outer ring raceway 26. The cage 24 has an annular shape, and is formed with a plurality of pockets 27 along the circumferential direction. The balls 23 and the cage 24 are provided in an annular space 11 formed between the inner ring 21 and the outer ring 22.

The cage 24 has an annular shape as a whole, and has an annular portion 28a on one side of the balls 23 in the axial direction, an annular portion 28b on the other side of the balls 23 in the axial direction, and a plurality of cage bars 29 that couple the annular portions 28a and 28b to each other. Spaces between the annular portions 28a and 28b and between the cage bars 29 and 29 which are adjacent to each other in the circumferential direction serve as the pockets 27. One ball 23 is housed in each of the pockets 27. With this configuration, the cage 24 can hold the plurality of balls 23 at intervals in the circumferential direction.

The cage 24 is made of resin (e.g. phenol resin). The inner ring 21 and the outer ring 22 are made of steel such as bearing steel. The balls 23 may be made of steel such as bearing steel, or may be made of ceramics.

Figure 2:
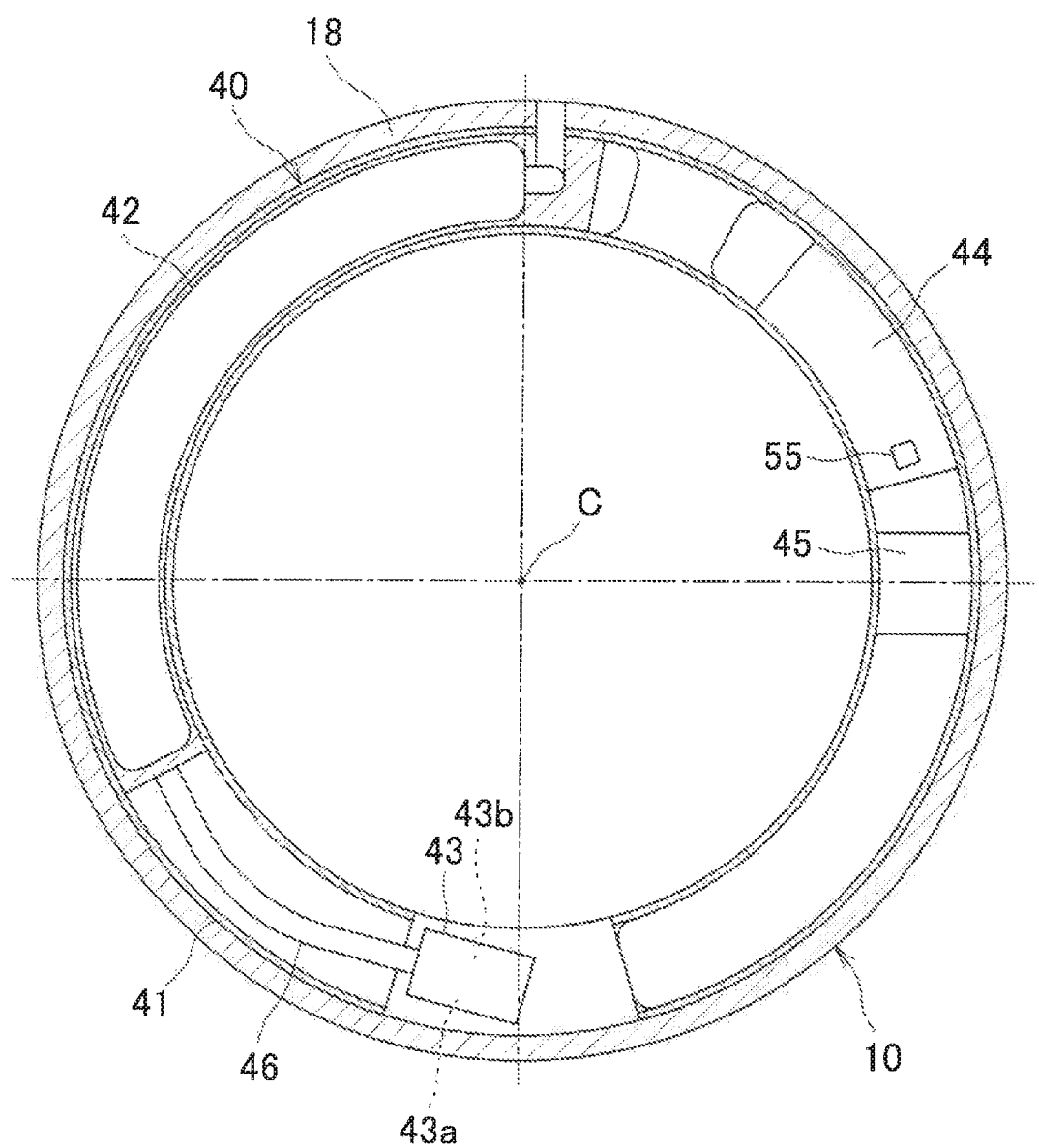
FIG. 2 is a cross-sectional view of an oil supply unit as seen in the axial direction.

FIG. 2 is a cross-sectional view of the oil supply unit 40 as seen in the axial direction. The oil supply unit 40 has a circular ring shape as a whole. The oil supply unit 40 includes a tank 42 and a pump 43. The tank 42 and the pump 43 are provided in an annular body portion 41 of the oil supply unit 40. The oil supply unit 40 includes a control unit 44 and a power source portion 45, and further includes a temperature sensor 55.

The body portion 41 is attached to the inner peripheral side of the outer ring spacer 18, and has a function as a frame that holds the pump 43 etc. The body portion 41 is a circular ring member, and is formed with hollow spaces. The pump 43, the control unit 44, the power source portion 45, and the temperature sensor 55 are provided in the hollow spaces. One of the hollow spaces serves as the tank 42. Consequently, the oil supply unit 40 which includes the body portion 41, the tank 42, the pump 43, the control unit 44, the power source portion 45, the temperature sensor 55, etc. is constituted integrally.

In FIG. 2, the tank 42 stores lubricating oil (oil), and is connected to the pump 43 through piping 46 in order to cause the lubricating oil to flow to the pump 43.

In FIG. 1, the pump 43 has a function of supplying lubricating oil to the bearing portion 20. In order to demonstrate this function, the pump 43 has a pump body 48 provided with a nozzle (ejection port) 50 that discharges lubricating oil. The pump body 48 has an oil chamber (internal space) 43b, which is a space that is connected to the nozzle 50 and that stores lubricating oil, and a piezo element (piezoelectric element) 43a. The nozzle 50 according to the embodiment is constituted of a minute through hole formed in a wall portion 49 of the pump body 48. The nozzle 50 opens in a side surface of the wall portion 49. An elastically deformable diaphragm 47 that constitutes a part of a wall of the oil chamber 43b is provided in the pump body 48. The piezo element 43a is attached to the diaphragm 47. When a voltage is applied to the piezo element 43a, the piezo element 43a deforms the diaphragm 47. Consequently, the volume of the oil chamber 43b is varied.

As described above, the volume of the oil chamber 43b is varied when the piezo element 43a operates. This allows lubricating oil in the oil chamber 43b to be discharged to the annular space 11 of the bearing portion 20. In particular, when the piezo element 43a operates, lubricating oil is discharged from the nozzle 50 as oil droplets P at an initial velocity. That is, the oil droplets P fly from the nozzle 50. The nozzle 50 opens toward the inner ring raceway 25. The oil droplets P which are discharged from the nozzle 50 can hit the balls 23, or hit the inner ring raceway 25 even if they pass through a space between the balls 23 and 23 which are adjacent to each other. Power for operation of the pump 43 is supplied from the power source portion 45 (see FIG. 2). The timing etc. to cause the pump 43 to operate is controlled by the control unit 44. Control of operation of the pump 43 will be described later.

From the above, the pump 43 is a piezo pump that discharges lubricating oil through drive of the piezo element 43a. The pump 43 is configured to receive lubricating oil from the tank 42 in the oil chamber 43b, and to eject lubricating oil in the oil chamber 43b (cause lubricating oil in the oil chamber 43b to fly) from the nozzle 50 toward a target of the bearing portion 20 as the oil droplets P. From the viewpoint of efficient use of lubricating oil, the pump 43 ejects a determined amount of the oil droplets P in one discharge operation to cause the oil droplets P to reach the target of the bearing portion 20. Several picoliters to several nanoliters of lubricating oil are ejected from the nozzle 50 as the oil droplets P in one operation of the pump 43. In the embodiment, the target is the balls 23 and the inner ring raceway 25. The oil supply unit 40 illustrated in FIG. 1 has a windshield portion 51 that covers a region of passage of the oil droplets P which are ejected from the nozzle 50. The windshield portion 51 prevents the oil droplets P from being affected by a flow of air generated in the annular space 11 when the bearing portion 20 is rotated.

Figure 3:
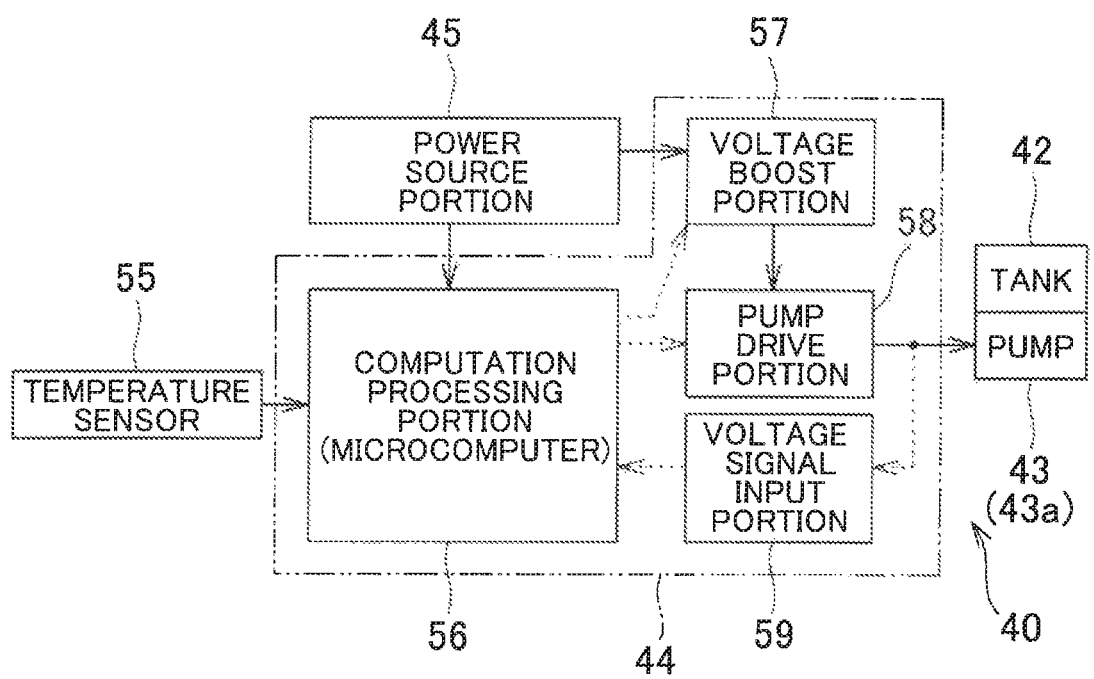
FIG. 3 is a block diagram of the oil supply unit.

FIG. 3 is a block diagram of the oil supply unit 40. The oil supply unit 40 has the tank 42, the pump 43, the control unit 44, the power source portion 45, and the temperature sensor 55. The power source portion 45 includes a battery, and outputs power at a predetermined voltage. The temperature sensor 55 measures a temperature in the oil supply unit 40, and outputs the measurement results to the control unit 44 (computation processing portion 56) as temperature information. The temperature sensor 55 preferably measures the temperature of lubricating oil in the tank 42. The control unit 44 has the computation processing portion (control portion) 56, a voltage boost portion 57, a pump drive portion 58, and a voltage signal input portion 59.

The computation processing portion 56 is composed of a microcomputer, and has a function of performing various computation processes. A program is stored in an internal memory of the microcomputer. The program causes the microcomputer (computation processing portion 56) to function as a control portion that controls the oil supply unit 40. That is, when the program is executed by the computation processing portion 56, various types of control are performed on the voltage boost portion 57 and the pump drive portion 58. As described later, the computation processing portion 56 causes the pump 43 to operate while varying the time for voltage boost by the voltage boost portion 57 on the basis of the temperature information which is obtained by the temperature sensor 55.

The voltage boost portion 57 is constituted of a voltage boost circuit that includes switching elements, transistors, etc. The voltage boost portion 57 boosts the voltage of the power source portion 45 by performing on/off control on the switching elements etc. That is, the voltage boost portion 57 has a function of boosting the voltage to be applied to the piezo element 43*a* of the pump 43. The pump drive portion 58 is constituted of switching elements and transistors. The pump drive portion 58 outputs a signal at a predetermined voltage that has been boosted by the voltage boost portion 57 to the piezo element 43*a* at a predetermined timing by switching the switching elements. The timing is controlled by the computation processing portion 56. The voltage signal input portion 59 acquires the actual pump drive voltage, and is used to monitor whether or not the pump 43 is operating at a predetermined voltage (monitoring by the computation processing portion 56).

Figure 6:
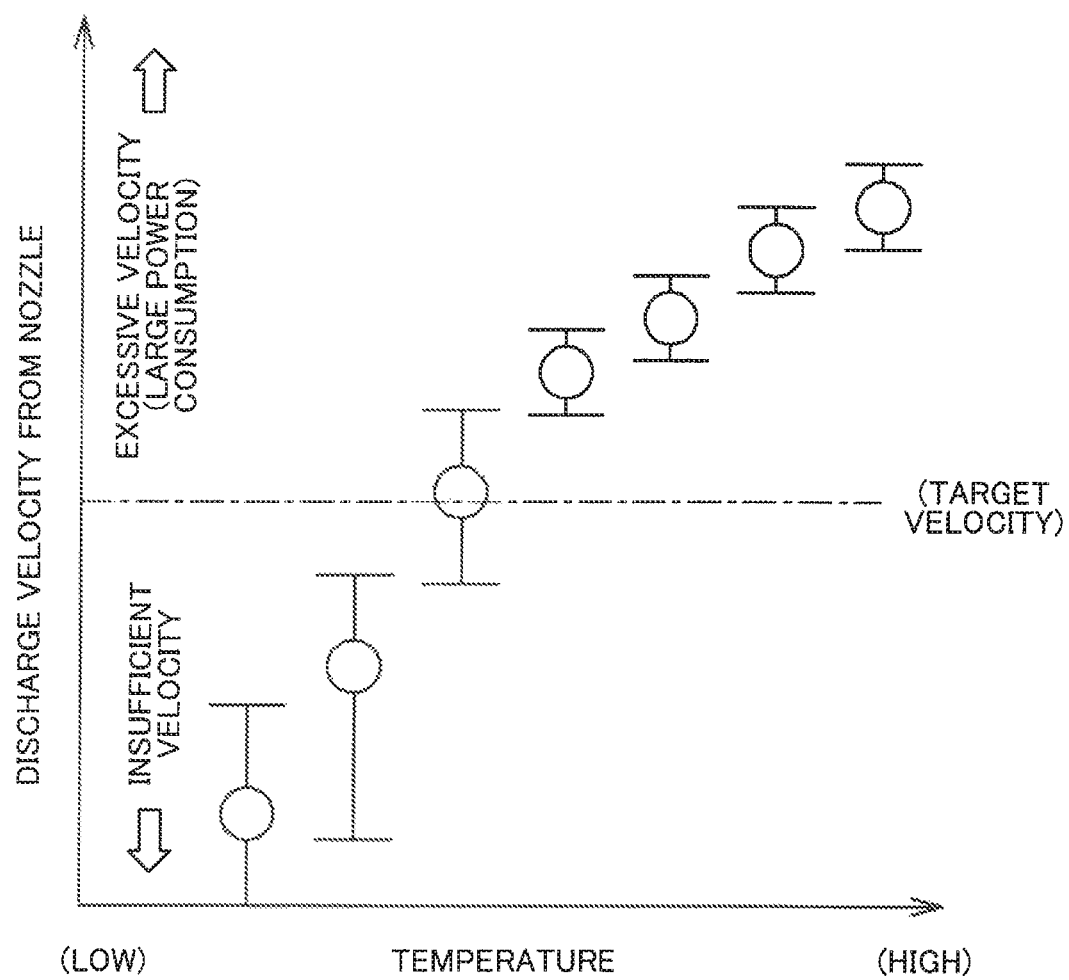
FIG. 6 is a graph illustrating the relationship between the temperature of lubricating oil and the discharge velocity of oil droplets discharged from a nozzle of a pump.

The relationship (conventional example) between the temperature of lubricating oil and the discharge velocity of the oil droplets P which are discharged from the nozzle 50 of the pump 43 will be described with reference to FIG. 6. As described above, a minute amount (several picoliters to several nanoliters) of lubricating oil (oil droplets P) is ejected from the nozzle 50 in one operation of the pump 43. Therefore, the discharge velocity of the oil droplets P is significantly affected by the temperature of the lubricating oil. That is, as the temperature becomes higher, the viscosity of the lubricating oil becomes lower. Consequently, the discharge velocity becomes higher as illustrated in FIG. 6, and the discharge velocity of the oil droplets P may become excessive. As the temperature becomes lower, in contrast, the viscosity of the lubricating oil becomes higher. Consequently, the discharge velocity becomes lower as illustrated in FIG. 6. In the case where the temperature is low, the discharge velocity of the oil droplets P may be insufficient, and the oil droplets P may not reach the predetermined target of the bearing portion 20. In FIG. 6, a target velocity is indicated by the long dashed short dashed line. The oil droplets P are preferably discharged at the target velocity or a velocity that is slightly higher than the target velocity.

Thus, in the embodiment, the control unit 44 performs control so as to vary the voltage (pump drive voltage) to be applied to the piezo element 43*a* of the pump 43 in accordance with the temperature information which is obtained by the temperature sensor 55. This control will be described specifically below.

Figure 4A:
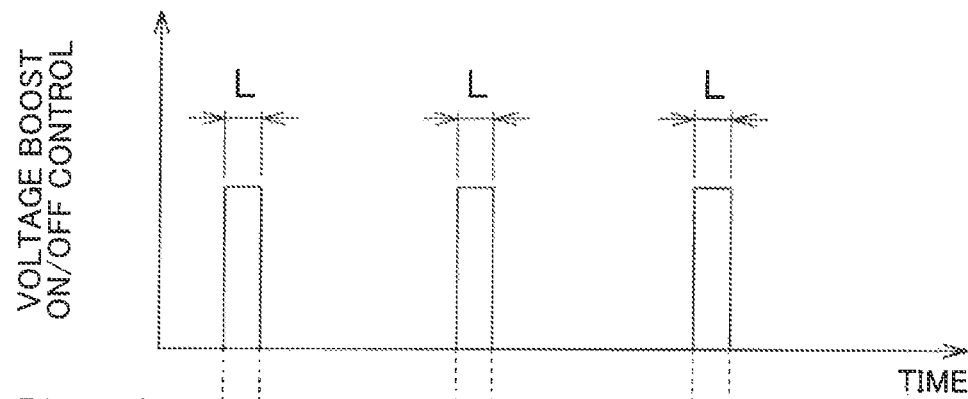
FIGS. 4A, 4B, and 4C illustrate the function of the oil supply unit.
Figure 4B:
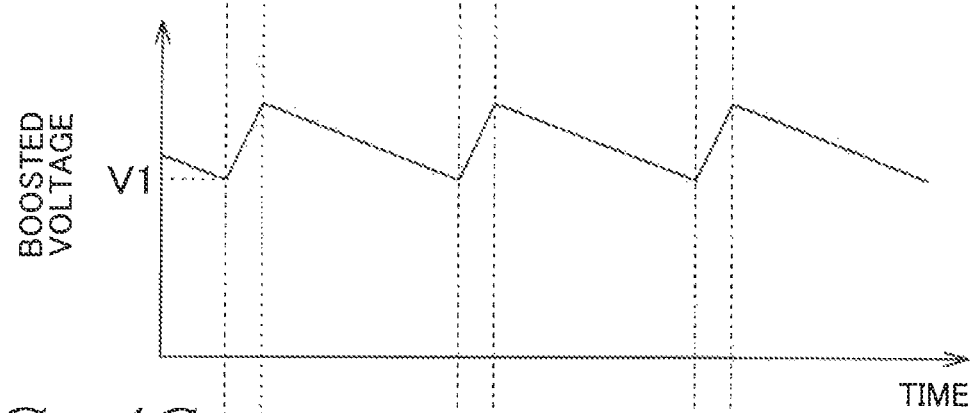
Figure 4C:
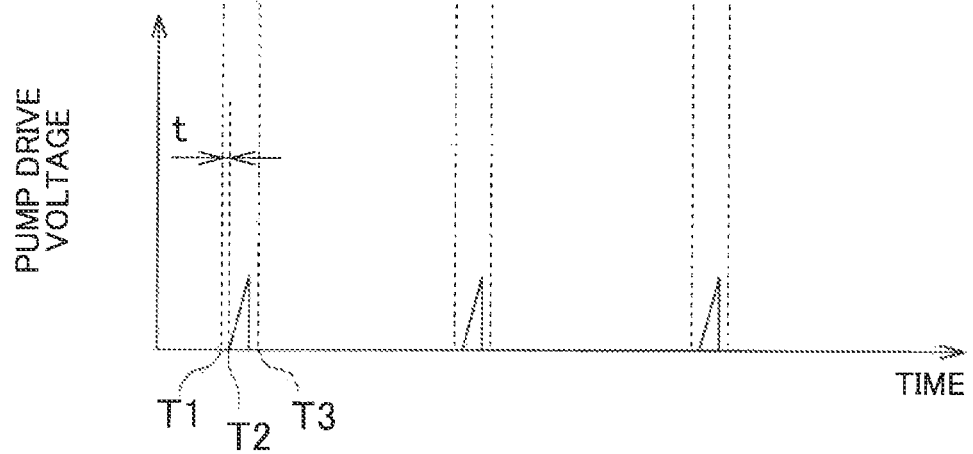
Figure 5A:
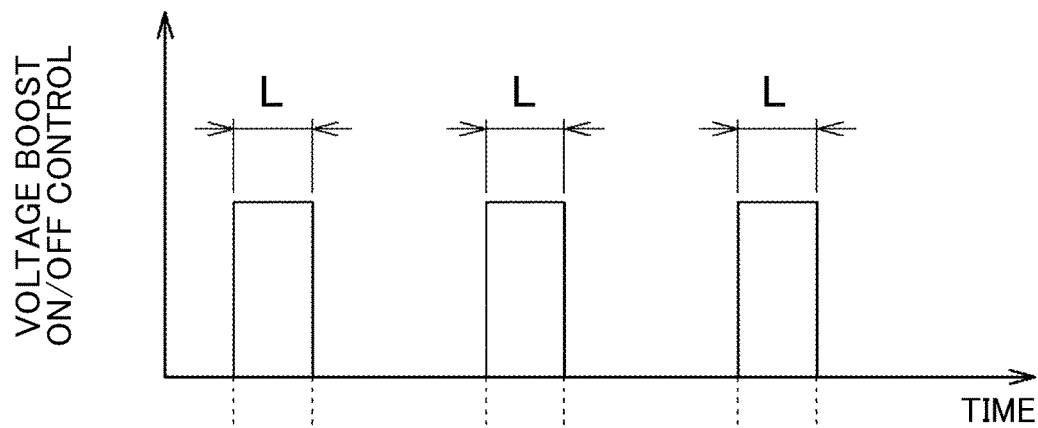
FIGS. 5A, 5B, and 5C illustrate the function of the oil supply unit.
Figure 5B:
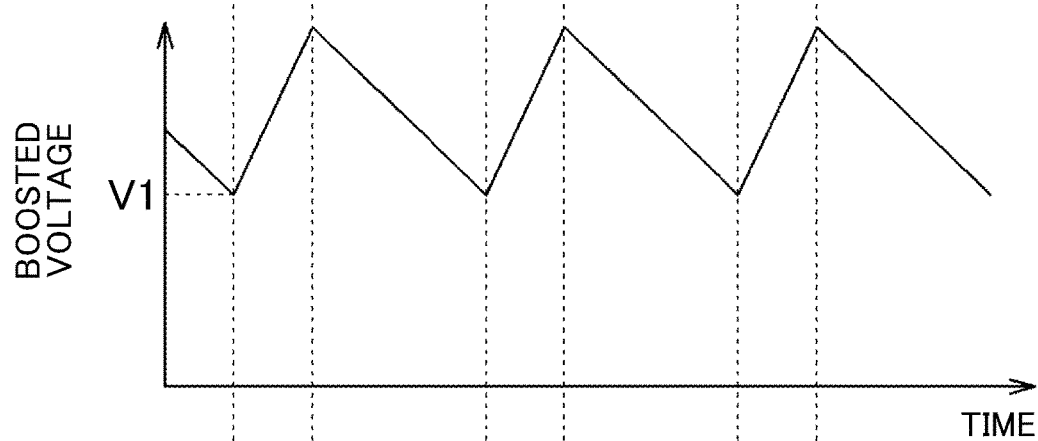
Figure 5C:
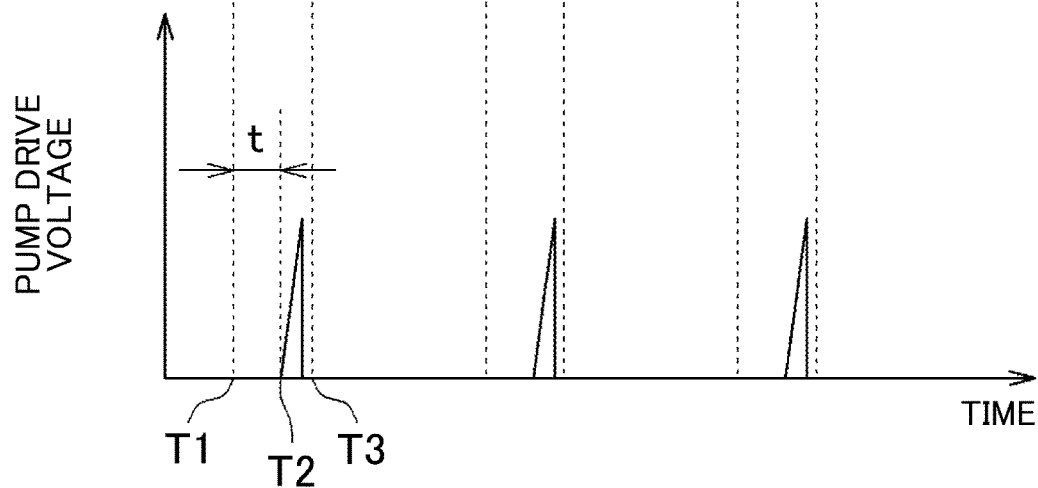

FIGS. 4A, 4B, 4C, 5A, 5B, and 5C illustrate the function of the oil supply unit 40. FIGS. 4A and 5A illustrate voltage boost on/off control performed by the voltage boost portion 57. FIGS. 4B and 5B illustrate how the voltage is boosted by the voltage boost portion 57 (temporal variations in voltage). FIGS. 4C and 5C illustrate a voltage (pump drive voltage) output from the pump drive portion 58 to be applied to the piezo element 43*a*. FIGS. 4A, 4B, and 4C illustrate a case where the temperature is high. FIGS. 5A, 5B, and 5C illustrate a case where the temperature is low.

When the voltage boost portion 57 which performs voltage boost on/off control is turned on at time T1 (FIGS. 4A, 4B, and 4C), a power source voltage (Vi) of the power source portion 45 is boosted in a time period (time T1 to time T3) in which the voltage boost portion 57 is turned on. When the voltage boost portion 57 is turned off at time T3, the voltage boost is stopped. When a predetermined time t elapses since time T1, the voltage which has been boosted from the power source voltage is provided to the piezo element 43*a* through the pump drive portion 58 at a predetermined timing (time T2). When the boosted voltage is applied, the piezo element 43*a* starts drive (deformation) in accordance with the boosted voltage, varies the volume of the oil chamber 43*b* in the pump 43, and discharges lubricating oil from the nozzle 50 as the oil droplets P. In the case of the embodiment, the timing (time T2) is a timing immediately after the predetermined time t has elapsed. However, the timing (time T2) may be a timing when a (very short) time has elapsed after the lapse of the predetermined time t.

The predetermined time t which starts at time T1 corresponds to a voltage boost time since the start of voltage boost by the voltage boost portion 57 until the start of the drive of the piezo element 43*a*. The predetermined time t will be hereinafter referred to as a "voltage boost time t". As the voltage boost time t becomes longer, the pump drive voltage becomes higher. Conversely, as the voltage boost time t becomes shorter, the pump drive voltage becomes lower. The control unit 44 according to the embodiment uses the voltage boost time t as a changeable parameter.

As illustrated in FIGS. 4A, 4B, and 4C, in the case where the temperature is high, the voltage boost time t is short. As illustrated in FIGS. 5A, 5B, and 5C, in the case where the temperature is low, the voltage boost time t is long. In this way, the computation processing portion 56 performs control so as to vary the voltage boost time t. In the embodiment, in particular, control is performed so as to vary the voltage boost time t on the basis of the temperature information which is acquired by the temperature sensor 55. That is, the computation processing portion 56 sets the length of the voltage boost time t, which is a changeable parameter, to be longer or shorter in accordance with the temperature information. The computation processing portion 56 can vary the voltage boost time t for the voltage boost portion 57 in this way. Consequently, the voltage (pump drive voltage) to be applied to the piezo element 43*a* can be varied.

Control for setting the length of the voltage boost time t will be described specifically. The computation processing portion 56 sets the voltage boost time t, which is included in a period since the start (time T1) of voltage boost by the voltage boost portion 57 until the start (time T2) of drive of the piezo element 43*a*, to be longer in the case where the temperature is low (see FIGS. 5A, 5B, and 5C) than that in the case where the temperature is high (see FIGS. 4A, 4B, and 4C). Through this control, the pump 43 performs desired discharge, in which the voltage (pump drive voltage) to be applied to the piezo element 43*a* is increased by making the voltage boost time t longer, in the case where the temperature is low (at a first temperature; see FIGS. 5A, 5B, and 5C). That is, although the viscosity of lubricating oil is high, the discharge velocity is prevented from becoming insufficient by increasing the amount of operation of the pump 43 (amount of operation of the piezo element 43*a*) by increasing the pump drive voltage, allowing the oil droplets P to fly at a desired discharge velocity. Consequently, lubricating oil (oil droplets P) can be supplied to a desired target of the bearing portion 20.

In contrast, the pump 43 performs desired discharge, in which the voltage (pump drive voltage) to be applied to the piezo element 43a is lowered compared to the case at the first temperature by making the voltage boost time t shorter, in the case where the temperature is high (at a second temperature that is higher than the first temperature; see FIGS. 4A, 4B, and 4C). That is, the viscosity of lubricating oil is low compared to the case at the first temperature, and thus the amount of operation of the pump 43 (amount of operation of the piezo element 43a) is reduced by lowering the pump drive voltage. This prevents the oil droplets P from flying at an excessive velocity, allowing the oil droplets P to fly at a desired discharge velocity. With the oil supply unit 40 according to the embodiment, in this way, the pump drive voltage can be optimized in accordance with the viscosity (temperature) of lubricating oil, which enables the discharge velocity of the oil droplets P to have a preferable value.

Figure 7:
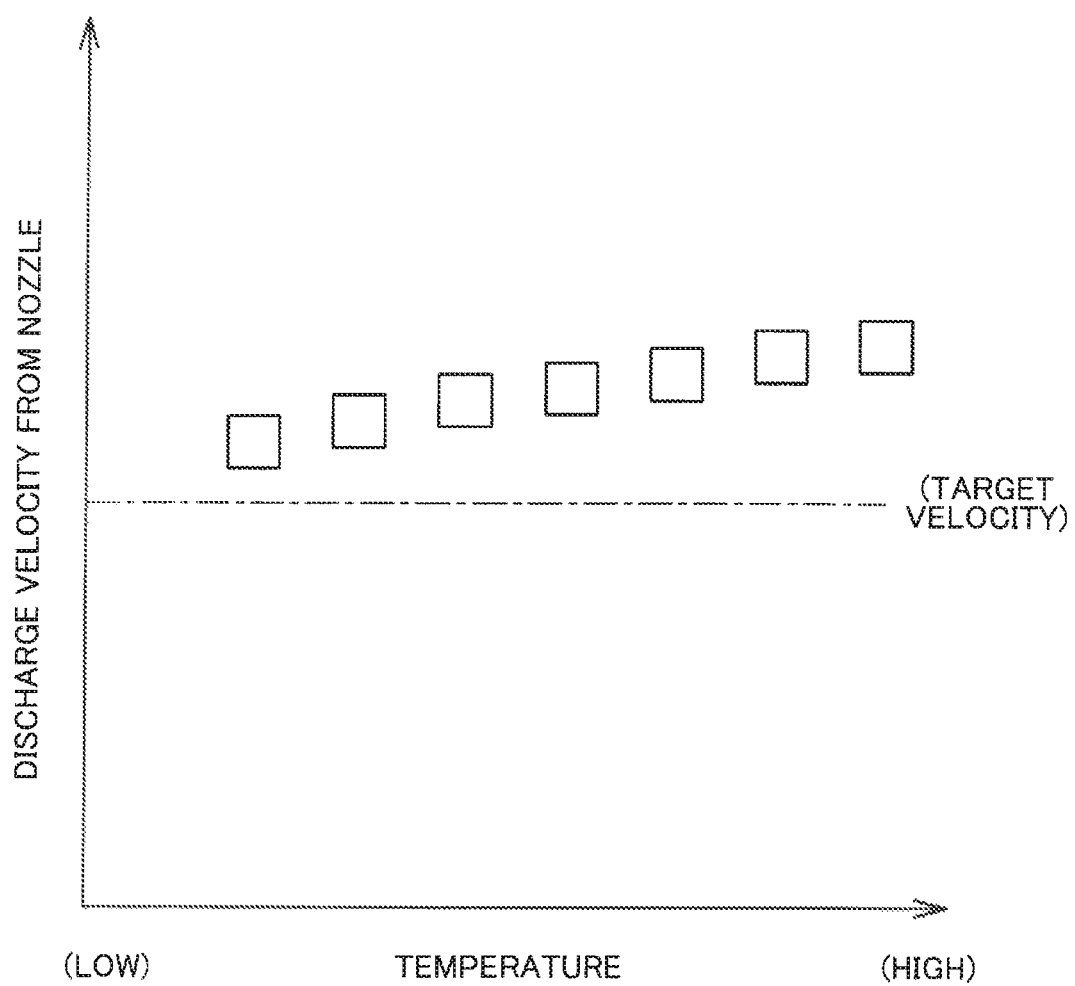
FIG. 7 is a graph illustrating the relationship between the temperature of lubricating oil and the discharge velocity of oil droplets discharged from the nozzle of the pump.

In the program which is stored in the internal memory of the computation processing portion 56, the voltage boost time t is used as a variable parameter. The computation processing portion 56 sets the voltage boost time t, which is a variable parameter, and executes the program for causing the pump 43 to operate. The voltage boost time t can be changed in a multiplicity of steps or continuously. Thus, even in the case where the temperature is varied from moment to moment, the voltage boost time t is changed from moment to moment in accordance with such variations in temperature. Consequently, as illustrated in FIG. 7, the oil droplets P can be discharged at a discharge velocity around the target velocity in all the range from low temperatures to high temperatures.

The duration in which the voltage boost portion 57 is turned on is a time L (see 4A, 4B, 4C, 5A, 5B, and 5C) of voltage boost operation by the voltage boost portion 57. Therefore, the computation processing portion 56 sets the time L of the voltage boost operation by the voltage boost portion 57 for a case where the temperature is high (FIGS. 4A, 4B, and 4C) to be shorter than the time L of the voltage boost operation by the voltage boost portion 57 for a case where the temperature is low (FIGS. 5A, 5B, and 5C). With this control, power consumption of the power source portion 45 can be suppressed. That is, in the case where the temperature is high (in the case at the second temperature which is higher than the first temperature), the viscosity of lubricating oil is low, and thus the voltage to be applied to the piezo element 43a may be low. Thus, power consumption of the power source portion 45 can be suppressed by setting the voltage boost time t to be short. In the embodiment (see FIG. 2), in particular, the battery of the power source portion 45 is built in the oil supply unit 40. Therefore, the time before battery exhaustion can be extended by suppressing power consumption through the control. As a result, a contribution can be made to the reduction in frequency of maintenance of the oil supply unit 40. With this control, the discharge velocity of oil droplets P can be optimized and power consumption can be suppressed at the same time.

In the rolling bearing device 10 according to the embodiment configured as described above, the computation processing portion 56 (control portion) of the oil supply unit 40 has a function of causing the pump 43 to operate while varying the voltage boost time t which is included in a period since the start of voltage boost by the voltage boost portion 57 until the start of the drive of the piezo element 43a. With the method of supplying lubricating oil implemented by this function, it is possible to suppress the fluctuation of the manner of discharge of lubricating oil from the pump 43 in accordance with the viscosity (temperature) of the lubricating oil, which allows oil droplets P to be discharged at an appropriate discharge velocity.

In the embodiment, the oil supply unit 40 has the temperature sensor 55, and the computation processing portion 56 causes the pump 43 to operate while varying the voltage boost time t in accordance with temperature information (temperature of lubricating oil) obtained by the temperature sensor 55. Specifically, the computation processing portion 56 is configured to set the voltage boost time t, which is a changeable parameter, in accordance with the temperature information. Therefore, control can be performed in accordance with the temperature, and the oil droplets P can be discharged at an appropriate discharge velocity without being affected by the temperature (see FIG. 7).

In the embodiment, the voltage boost time t is a changeable parameter. The pump 43 is caused to operate while varying the voltage boost time t with the computation processing portion 56 setting (adjusting) the voltage boost time t. In another embodiment, on the contrary, a plurality of patterns (programs) with different values of the voltage boost times t is set in advance. A predetermined one of the plurality of patterns may be selected (in accordance with the temperature), the voltage may be boosted in the voltage boost time t corresponding to the selected pattern, and the boosted voltage may be applied to the piezo element 43a to drive the pump. That is, a first (sub) program for low temperatures and a second (sub) program for high temperatures are set as control programs for causing the pump 43 to operate. The voltage boost time t is set to different values in the first (sub) program and the second (sub) program. One of the (sub) programs may be selected and executed in accordance with the temperature at the time when (or in accordance with the time period in which) the oil supply unit 40 is caused to function. Also in this case, the computation processing portion 56 (control portion) is configured to cause the pump 43 to operate while varying the voltage boost time t which is included in a period since the start of voltage boost by the voltage boost portion 57 until the start of the drive of the piezo element 43a.

The embodiment disclosed above is exemplary in all respects, and not limiting. That is, the rolling bearing device according to the present invention is not limited to the illustrated embodiment, and may be in other embodiments without departing from the scope of the present invention. In the embodiment, the temperature sensor 55 acquires the temperature of lubricating oil to obtain temperature information. However, the temperature sensor 55 may acquire a different temperature, such as the temperature around the rolling bearing device 10. In the embodiment, the temperature sensor 55 is used. However, a sensor that can measure the viscosity of lubricating oil may also be used.

In the embodiment, the bearing portion 20 is an angular ball bearing. However, the type of the bearing is not limited thereto, and may be a deep-groove ball bearing, or may be a tapered roller bearing or a cylindrical roller bearing. In addition, the rolling bearing device 10 may be used for usage other than a main spindle of a machine tool.

Further, the oil supply unit 40 may be used for usage other than lubrication of the bearing portion 20. For example, the oil supply unit 40 may be used for lubrication of a gear mechanism (rotary device) such as a speed reducer. That is, the oil supply unit 40 is a device provided in a rotary device and configured to supply lubricating oil to an oil supply region of the rotary device that requires oil supply. The oil supply unit 40 has the pump (piezo pump) 43, the voltage boost portion 57, and the computation processing portion (control portion) 56 (with reference to FIG. 3). The pump 43 discharges lubricating oil through drive of the piezo element 43a. The voltage boost portion 57 boosts the voltage to be applied to the piezo element 43a. The computation processing portion 56 causes the pump 43 to operate while varying the voltage boost time which is included in a period since the start of voltage boost by the voltage boost portion 57 until the start of the drive of the piezo element 43a. The various components of the oil supply unit 40 described above in relation to the embodiment can be applied to such an oil supply unit 40.

With the present invention, it is possible to suppress the manner of discharge of lubricating oil from a pump fluctuating in accordance with the viscosity (temperature) of the lubricating oil.

What is claimed is:

1. A rolling bearing device comprising:
  a bearing portion that has an inner ring, an outer ring, a plurality of rolling elements interposed between the inner ring and the outer ring, and a cage that holds the plurality of rolling elements; and
  an oil supply unit provided adjacent to the bearing portion in an axial direction to supply lubricating oil to the bearing portion, wherein
  the oil supply unit includes:
    a pump that discharges the lubricating oil through drive of a piezo element;
    a voltage boost portion that boosts a voltage to be applied to the piezo element; and
    a control portion that causes the pump to operate while varying a voltage boost time included in a period since start of voltage boost by the voltage boost portion until start of the drive of the piezo element such that the voltage boost increases the voltage from a first value greater than zero to a second value greater than the first value and such that varying a voltage boost includes changing voltages from values greater than zero to other values greater than zero.

2. The rolling bearing device according to claim 1, wherein
  the control portion causes the pump to operate while varying the voltage boost time in accordance with temperature information.

3. The rolling bearing device according to claim 1, wherein
  the control portion sets the voltage boost time, which is a changeable parameter, in accordance with temperature information.

4. The rolling bearing device according to claim 1, wherein
  the control portion sets the voltage boost time, which is included in the period since the start of voltage boost by the voltage boost portion until the start of the drive of the piezo element, to be longer in the case where a temperature is below a first threshold relative to when the temperature is above a second threshold.

5. The rolling bearing device according to claim 1, wherein
  the control portion sets a time for voltage boost operation by the voltage boost portion to be shorter in the case where a temperature is above a first threshold relative to when the temperature is below a threshold.

6. An oil supply unit provided in a rotary device and configured to supply lubricating oil to an oil supply region of the rotary device that requires oil supply, the oil supply unit comprising:
  a pump that discharges the lubricating oil through drive of a piezo element;
  a voltage boost portion that boosts a voltage to be applied to the piezo element; and
  a control portion that causes the pump to operate while varying a voltage boost time included in a period since start of voltage boost by the voltage boost portion until start of the drive of the piezo element, such that the voltage boost increases the voltage from a first value greater than zero to a second value greater than the first value and such that varying a voltage boost includes changing voltage from values greater than zero to other values greater than zero.

7. A method in which an oil supply unit supplies lubricating oil to an oil supply region of a rotary device that requires oil supply,
  the oil supply unit including a pump that discharges the lubricating oil through drive of a piezo element and a voltage boost portion that boosts a voltage to be applied to the piezo element, the method comprising:
  causing the pump to operate while varying a voltage boost time included in a period since start of voltage boost by the voltage boost portion until start of the drive of the piezo element such that the voltage boost increases the voltage from a first value greater than zero to a second value greater than the first value and such that varying a voltage boost includes changing voltage from values greater than zero to other values greater than zero.

8. A non-transitory computer readable medium comprising a program that, when executed by a computer, causes the computer to:
  control an oil supply unit that supplies lubricating oil to an oil supply region of a rotary device that requires oil supply, the oil supply unit including a pump that discharges the lubricating oil through drive of a piezo element and a voltage boost portion that boosts a voltage to be applied to the piezo element; and
  control the pump to operate while varying a voltage boost time included in a period since start of voltage boost by the voltage boost portion until start of the drive of the piezo element such that the voltage boost increases the voltage from a first value greater than zero to a second value greater than the first value and such that varying a voltage boost includes changing voltage from values greater than zero to other values greater than zero.

* * * * *